United States Patent [19]
Campbell

[11] 3,811,388
[45] May 21, 1974

[54] SUB SOIL IRRIGATOR AND TREE LIFT

[76] Inventor: William L. Campbell, Box 85, Whitewood, S. Dak. 57773

[22] Filed: Aug. 15, 1972

[21] Appl. No.: 280,750

[52] U.S. Cl............................ 111/7.1, 254/132, 37/2
[51] Int. Cl.............................................. A01c 23/02
[58] Field of Search.............. 111/7.1; 37/2; 254/132

[56] References Cited
UNITED STATES PATENTS

| | | | |
|---|---|---|---|
| 3,118,402 | 1/1964 | Nelson | 111/7.1 |
| 3,282,567 | 11/1966 | Weniger | 254/132 |
| 1,911,287 | 5/1933 | Pladson | 254/132 X |
| 2,018,003 | 10/1935 | Axtell | 111/7.1 |
| 2,638,730 | 5/1953 | Davidson | 111/7.1 UX |

Primary Examiner—Robert E. Pulfrey
Assistant Examiner—R. T. Rader
Attorney, Agent, or Firm—Victor J. Evans & Co.

[57] ABSTRACT

A sub soil irrigator and tree lift comprising an elongate hollow lever member having a piercing blade on one end thereof and a plurality of openings through the tubular lever adjacent the piercing blade. A water connection is provided at the opposite end of the lever to provide a flow of water through the lever and out the openings adjacent the piercing blade. A ground engaging fulcrum member adjustably and pivotally supports the lever at a point spaced from but adjacent the piercing blade. The piercing blade is engaged under the root system of the plant, tree or the like and water is provided through the tubular lever and simultaneously the lever is pressed downwardly at its opposite end to raise the plant to give greater penetration of the water for removing the plant or for properly watering the plant.

2 Claims, 5 Drawing Figures

PATENTED MAY 21 1974  3,811,388
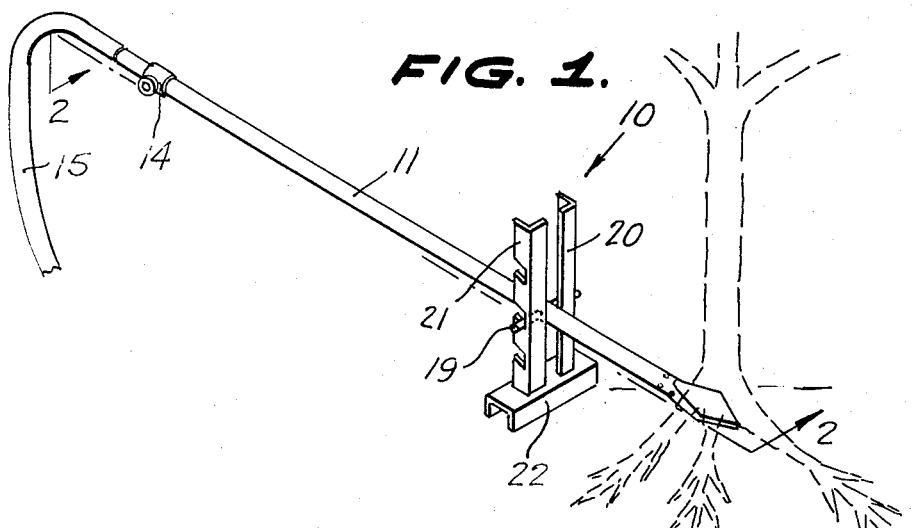
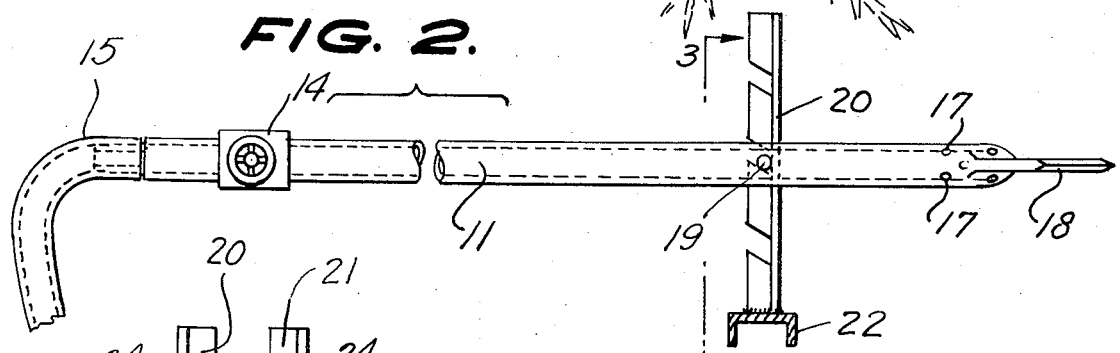
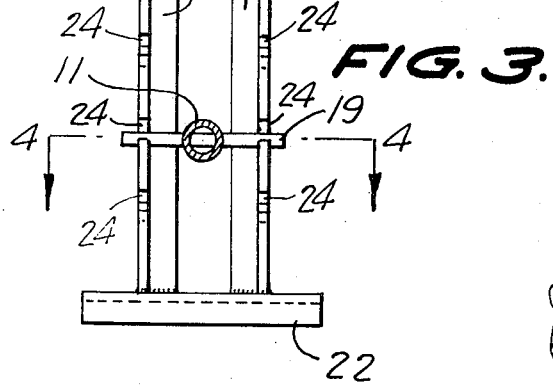
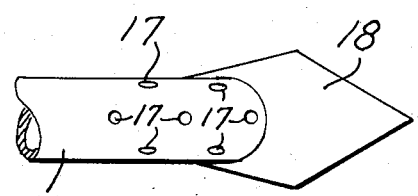
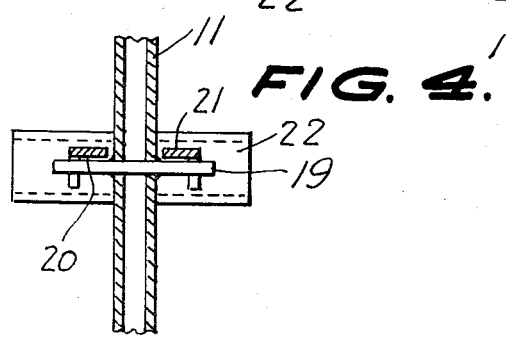

SUB SOIL IRRIGATOR AND TREE LIFT

BACKGROUND OF THE INVENTION

Field of the Invention

The present invention relates to sub soil irrigators and tree lifts for completely watering the root system to the plant.

Summary of the Invention

A tubular lever supported on a ground engaging fulcrum, has a water supply at one end and an outlet for the water at the opposite end adjacent a piercing blade for engaging beneath a tree or other plant. Pressure on the outer end of the lever causes the plant to be raised while water is supplied to the root system thereof.

The primary object of the invention is to provide a combined irrigator and lift device for watering the root system of a plant.

Other objects and advantages will become apparent in the following specification when considered in the light of the attached drawings.

BRIEF DESCRIPTION OF THE DRAWINGS

FIG. 1 is a perspective view of the invention;

FIG. 2 is a fragmentary vertical sectional view, taken on line 2—2 of FIG. 1, looking in the direction of the arrows;

FIG. 3 is a fragmentary transverse sectional view, taken along the line 3—3 of FIG. 2, looking in the direction of the arrows;

FIG. 4 is a fragmentary transverse sectional view, taken along the line 4—4 of FIG. 3, looking in the direction of the arrows; and FIG. 5 is an enlarged fragmentary plan view of the piercing blade end of the lever.

DESCRIPTION OF THE PREFERRED EMBODIMENT

Referring now to the drawings in detail, wherein like reference characters indicate like parts throughout the several figures, the reference numeral 10 indicates generally a sub soil irrigator and tree lift constructed in accordance with the invention.

The sub soil irrigator and tree lift 10 includes an elongate tubular lever 11 having a water valve 14 threaded onto its outer end and connected to a water hose 15.

The flow of water from the hose 15 is directed through the tubular lever 11 to the outlet ports 17 formed in the end thereof opposite the valve 14. A piercing blade 18 is rigidly secured to the end of the tubular lever 11 opposite the valve 14 and is adapted for piercing the ground to engage under a tree or plant for reasons to be assigned.

A transverse fulcrum pin 19 is rigidly secured to the tubular lever 11 and projects on opposite sides thereof. A pair of upright angle iron members 20, 21 are arranged in spaced relation and secured to an inverted channel base member 22. The members 20, 21 are provided with downwardly sloping slots 24 arranged in horizontally aligned pairs to receive and pivotally carry the fulcrum pin 19.

In the use and operation of the invention the piercing blade 18 is forced into the ground to meet the root system of the tree, plant or the like and the valve 14 is opened to permit a supply of water to be expelled through the bores 17. As the water flows through the bores 17 downward pressure is exerted on the tubular lever 11 by forcing the base member 22 against the ground. The pressure of the tubular lever 11 causes the piercing blade 18 to move upwardly beneath the plant and to thus cause the plant to loosen in the ground so that the water can completely wet the root system thereof. The plant can thus be removed if obnoxious and discarded or if desired transplanted or left alone as desired.

The tubular lever 11 may be formed of round pipe or square tubing if desired.

Having thus described the preferred embodiment of the invention it should be understood that numerous structural modifications and adaptations may be resorted to without departing from the spirit of the invention.

What is claimed is:

1. A combined sub soil irrigator and tree lift comprising an elongate tubular lever having opposite ends, a water valve connected to the outer end of said lever, a water hose connected to said water valve, the other end of the lever being provided with a plurality of outlet ports, a piercing blade rigidly affixed to the end of the tubular lever opposite the valve, said blade having a flat construction, said blade being arranged adjacent said ports, a transverse vertically adjustable fulcrum pin secured to said tubular lever and projecting on opposite sides thereof, a pair of spaced apart angle members, a base member secured to the lower ends of said angle members, said angle members being provided with a plurality of superimposed downwardly sloping slots arranged in horizontal pairs for selectively receiving and carrying said fulcrum pin, whereby the blade can be inserted under a tree or the like, and water can be supplied through the ports to simultaneously irrigate the soil and lift the tree.

2. The structure as claimed in claim 1 wherein the base member comprises an inverted channel member that is horizontally disposed.

* * * * *